(12) United States Patent
Guddanti et al.

(10) Patent No.: US 8,856,803 B2
(45) Date of Patent: Oct. 7, 2014

(54) CONTENT DELIVERY WITHIN AN APPLICATION

(75) Inventors: Venkata Guddanti, Centennial, CO (US); Michael Elges, Littleton, CO (US)

(73) Assignee: Oracle International Corporation, Redwood Shores, CA (US)

( * ) Notice: Subject to any disclaimer, the term of this patent is extended or adjusted under 35 U.S.C. 154(b) by 278 days.

(21) Appl. No.: 13/287,368

(22) Filed: Nov. 2, 2011

(65) Prior Publication Data

US 2013/0111506 A1      May 2, 2013

(51) Int. Cl.
*G06F 13/00* (2006.01)
*G06F 17/00* (2006.01)
*G06F 12/00* (2006.01)
*G06F 17/30* (2006.01)

(52) U.S. Cl.
CPC ............................... *G06F 17/30902* (2013.01)
USPC ............................ 719/311; 707/600; 711/118

(58) Field of Classification Search
None
See application file for complete search history.

(56) References Cited

U.S. PATENT DOCUMENTS

| | | | |
|---|---|---|---|
| 5,926,177 A | 7/1999 | Hatanaka et al. | |
| 6,094,662 A | 7/2000 | Hawes | |
| 6,226,642 B1 | 5/2001 | Beranek et al. | |
| 6,335,741 B1 | 1/2002 | Nock | |
| 6,675,228 B1 | 1/2004 | Bahrs et al. | |
| 6,931,418 B1 | 8/2005 | Barnes | |
| 7,017,145 B2 | 3/2006 | Taylor | |
| 7,155,492 B2 | 12/2006 | Obara et al. | |
| 7,328,242 B1 | 2/2008 | McCarthy et al. | |
| 7,426,687 B1 * | 9/2008 | Schultz et al. | ................. 715/208 |
| 7,702,719 B1 | 4/2010 | Betz et al. | |
| 7,738,688 B2 | 6/2010 | Eichhorn et al. | |
| 7,844,889 B2 * | 11/2010 | Rohrabaugh et al. | .......... 715/200 |
| 7,934,191 B2 | 4/2011 | Yassin | |
| 2002/0112033 A1 | 8/2002 | Doemling et al. | |
| 2004/0046789 A1 | 3/2004 | Inanoria | |
| 2004/0107250 A1 | 6/2004 | Marciano | |
| 2006/0184913 A1 | 8/2006 | Coulthard et al. | |
| 2006/0230334 A1* | 10/2006 | Slawson et al. | ............. 715/500.1 |
| 2007/0150488 A1 | 6/2007 | Barsness et al. | |
| 2007/0179852 A1 | 8/2007 | Martin et al. | |
| 2007/0220493 A1 | 9/2007 | Morizawa | |
| 2007/0233823 A1 | 10/2007 | Traub et al. | |

(Continued)

FOREIGN PATENT DOCUMENTS

| | | |
|---|---|---|
| GB | 2387453 A | 10/2003 |
| WO | 0023916 A1 | 4/2000 |

OTHER PUBLICATIONS

"Wait Indicator", 4ourth Mobile Design Pattern Library. Jul. 31, 2011, pp. 1-4.*

(Continued)

*Primary Examiner* — H S Sough
*Assistant Examiner* — Phuong Hoang
(74) *Attorney, Agent, or Firm* — Miles & Stockbridge P.C.

(57) ABSTRACT

A view component of an application requests content from a model component of the application, where the request for content includes a request for data. The model component determines whether the requested data is available. If the requested data is available, the model component delivers the requested content and the requested data. If the requested data is not available, the model component first delivers the requested content and a data placeholder, and after the model component retrieves the data, the model component delivers the requested data to replace the data placeholder.

23 Claims, 8 Drawing Sheets

(56) References Cited

U.S. PATENT DOCUMENTS

| | | | |
|---|---|---|---|
| 2008/0134158 | A1 | 6/2008 | Salz et al. |
| 2008/0201118 | A1 | 8/2008 | Luo |
| 2008/0301177 | A1 | 12/2008 | Doherty |
| 2009/0198828 | A1 | 8/2009 | Sullivan et al. |
| 2009/0284549 | A1 | 11/2009 | Flynn et al. |
| 2010/0180205 | A1 | 7/2010 | Deshpande et al. |

OTHER PUBLICATIONS

Robin Hames; "Data Caching Architecture: Using the ASP.NET Cache to cache data in a Model or Business Object layer, without a dependency on System.Web in the layer—Part One."; http://geekswithblogs.net/Rhames/archive/2011/01/10/using-the-asp.net-cache-to-cache-data-in-a-model.aspx; Posted Jan. 10, 2011.

PGVWiki; Model-View-Controller Architecture; http://wiki.phpgedview.net/en/index.php?title=Model-View-Controller_Architecture; Jun. 7, 2010.

"Hierarchical MCV"; http://alloyframework.org/manual/architecture/hierarchal-mvc/; updated Jul. 8, 2011.

Oracle, Installation Guide for Oracle JDeveloper, Apr. 2010, http://download.oracle.com/docs/cd/E14571_01/install.1111/e13666.pdf (last visited Sep. 27, 2011).

Google, Google Maps API Web Services, Copyright 2011, http://code.google.com/apis/maps/documentation/webservices/index.html (last visited Sep. 27, 2011); © 2011 Google.

Oracle, ADF 11g Primer, "Introduction to the building blocks of a Fusion Web Application," Oracle White Paper, Apr. 2007.

\* cited by examiner

| Name | Size (KB) | Type | Date Modified | Properties |
|---|---|---|---|---|
| File2.doc | 10 | Document File | 06/18/2009 6:06 PM | Properties |
| File2.html | 10 | HTML File | 06/18/2009 6:06 PM | Properties |
| File2.pdf | 10 | PDF File | 06/18/2009 6:06 PM | Properties |
| File2.xls | 10 | XLS File | 06/18/2009 6:06 PM | Properties |

Fig. 7

CONTENT DELIVERY WITHIN AN APPLICATION

FIELD

One embodiment is directed to a computer system, and more particularly, to a computer system that displays data.

BACKGROUND

A distributed application, such as a client-server application or an enterprise application, can be built according to a Model-View-Controller ("MVC") design pattern. According to the MVC design pattern, an application is separated into three layers: (1) a model layer; (2) a view layer; and (3) a controller layer. The model layer handles interactions with a data source and runs the business logic in the application. The view layer handles the user interface portion of the application. The view layer controls the appearance and layout of the user interface, and further controls how a user interacts with the application. The controller layer manages the application flow and acts as an interface between the model layer and the view layer. The controller layer controls a user's navigation of the application. In certain applications, the model layer can be split into two layers; the business services layer and the model layer. Like the model layer in the three-layer scenario, the business services layer of the four-layer scenario handles interactions with a data source and runs the business logic in the application. The model layer of the four-layer scenario provides an abstraction layer on top of the business services layer, enabling the view layer and controller layer to interface with different implementations of business services in a consistent way. If implemented this way, the view layer and the controller layer do not know (and do not need to know) the specific implementations of the various business services.

In a distributed application using the MVC architecture, one of the most expensive operations involved is retrieving data from the data store in the model layer. A slow model layer can impact the time it takes to render the user interface of the application and to display the data retrieved from the data store within the user interface, and can result in a poor usability experience for a user viewing the user interface in a client, whether the client is a client application (i.e., thick client) and the user interface is a screen of the client application, or whether the client is a web browser (i.e., thin client) and the user interface is a web page that is navigated to by the web browser. Furthermore, another expensive operation can be displaying an extremely large amount of data within the user interface of the application.

SUMMARY

One embodiment is directed to a computer-readable medium having instructions stored thereon that, when executed by a processor, cause the processor to deliver content to a user interface of an application. The instructions include receiving a request for content, where the request includes a request for data. The instructions further include determining whether the requested data is available, where the requested data is available when the data is cached in a memory. The instructions further include transmitting the requested content and the requested data in a single communication when the requested data is available, where the requested content and the requested data are displayed within the user interface of the application. The instructions further include transmitting the requested content and a data placeholder in a first communication when the requested data is not available, where the requested content and the data placeholder are displayed within the user interface of the application. The instructions further include retrieving the requested data from a data store when the requested data is not available. The instructions further include transmitting the requested data in a second communication when the requested data is not available, where the requested data is displayed in place of the data placeholder within the user interface of the application.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 7 illustrates a user interface of an application that displays a table that includes data, according to an embodiment of the invention.

DETAILED DESCRIPTION

Figure 1:
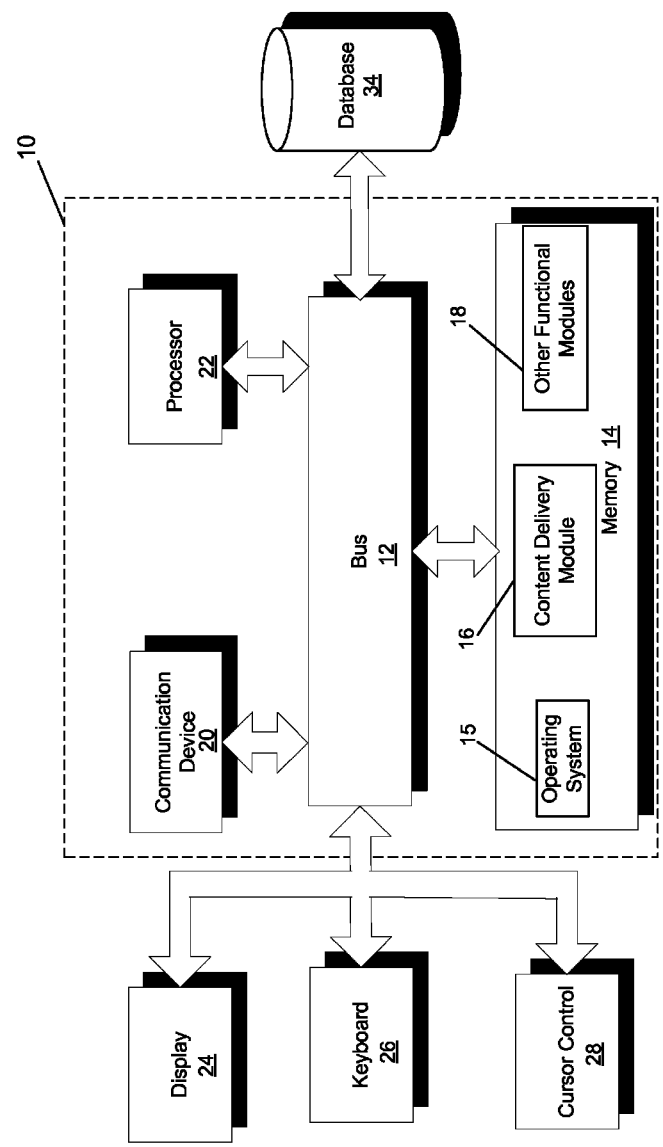
FIG. 1 illustrates a block diagram of a system that can implement an embodiment of the invention.

According to an embodiment, an application based on the MVC architecture includes a content delivery application programming interface ("API") that allows a view component of a view layer of the application to query a model component of a model layer of the application for available data. Data is available within the model component when the model component has cached the data in a memory and can deliver the data immediately upon request without first retrieving the data from a data store. The determination of whether data is available within the model component does not involve retrieving the data from a data store. Thus, a potentially expensive operation of communicating with the data store can be limited to only situations where the data is not available within the model component.

For example, while building a user interface to be rendered within the view component, if the model component indicates that a requested set of data is not available within the model component, the model component can delay issuing a request to a data store to retrieve data and instead deliver content that does not require the requested data to the view component. The view component can render the content that does not require the requested data, and thus, display this content within the user interface. The model component can then subsequently issue a request to the data store to retrieve data, where the request is a subsequent (and in certain scenarios, asynchronous) request. Upon receiving the data from the data store, the model component can then deliver the data to the view component. The view component can then render the data, and thus, display the data, along with the other content, within the user interface.

Thus, the content delivery API can optimize the delivery of content to the component, and optimize the rendering of the content within the user interface of the application. Content can include a web page or user interface screen, where content can also include one or more images displayed within the web page or user interface screen, such as tables, trees, or tree tables. Content can further include data contained within the web page or user interface screen, such as data contained within one or more tables, trees, or tree tables. Data can include a set of any qualitative or quantitative attributes, such as structured data, tabular data, and hierarchical data, that can be stored at a data store that the application can be operatively connected to.

In one embodiment, the application can be a distributed application that is implemented in a computer system, such as a client-server system, where the model layer of the distributed application is implemented in a server, the view layer of the distributed application is implemented in a client, and the server and client can communicate using an appropriate protocol, such as a network protocol.

In one embodiment, the view layer of the application can be implemented in a web browser, and the model layer of the application can be implemented in a web server. According to this embodiment, a model component of the model layer can deliver content to a view component of the view layer, where the content includes a web page, where the web page can include one or more tables, trees, or tree tables, and where the web page can include data contained within the one or more tables, trees, or tree tables. The model component can deliver a web page to the view component, and the view component can render the web page (including the data), and can display the web page (including the data) within the web browser.

In an alternate embodiment, the view layer of the application can be implemented in a client application, and the model layer of the application can be implemented in an application server. The client application may or may not be implemented on the same computer system where the application server is implemented. According to this embodiment, a model component of the model layer can deliver content to a view component of the view layer, where the content includes a user interface screen, where the user interface screen can include one or more tables, trees, or tree tables, and where the user interface screen can include data contained within the one or more tables, trees, or tree tables. The model component can deliver a user interface screen to the view component, and the view component can render the user interface screen (including the data), and can display the user interface screen (including the data) with the client application.

FIG. 1 illustrates a block diagram of a system 10 that can implement one embodiment of the invention. System 10 includes a bus 12 or other communications mechanism for communicating information between components of system 10. System 10 also includes a processor 22, operatively coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. System 10 further includes a communication device 20, such as a network interface card or other communications interface, to provide access to a network. As a result, a user may interface with system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with system 10.

According to one embodiment, memory 14 can store software modules that may provide functionality when executed by processor 22. The modules can include an operating system 15, a content delivery module 16, as well as other functional modules 18. Operating system 15 can provide an operating system functionality for system 10. Content delivery module 16 can provide functionality for delivering content to a user interface of an application, as will be described in more detail below. In certain embodiments, content delivery module 16 can comprise a plurality of modules that each provide specific individual functionality for delivering content to a user interface of an application. System 10 can also be part of a larger system. Thus, system 10 can include one or more additional functional modules 18 to include the additional functionality. For example, functional modules 18 may include modules that provide additional functionality, such as a "Fusion" product from Oracle Corporation.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

Figure 2:
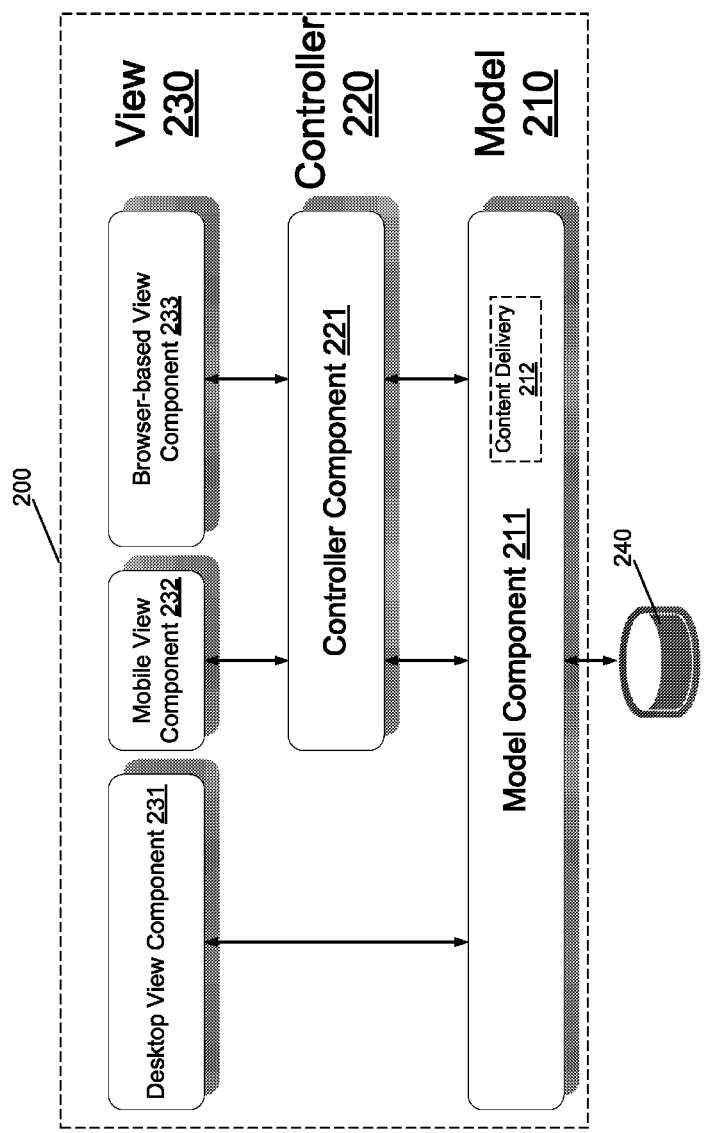
FIG. 2 illustrates an application that includes a model layer, a controller layer, and a view layer according to an MVC architecture, in accordance with an embodiment of the invention.

FIG. 2 illustrates an application 200 that includes a model layer 210, a controller layer 220, and a view layer 230 according to a MVC architecture, in accordance with an embodiment of the invention. Components of one layer can communicate with components of another layer using any type of communication known to one of ordinary skill in the relevant art, such as inter-process communication. Application 200 is also operatively connected to data store 240, where data store 240 is a repository of one or more integrated objects, where each integrated object contains data. In one embodiment, data store 240 is a database that can store data in an integrated collection of logically-related records or files, such as database 34 of FIG. 1. In an embodiment where data store 240 is a database, data store 240 can be an operational database, an analytical database, a data warehouse, a distributed database, an end-user database, an external database, a navigational database, an in-memory database, a document-oriented database, a real-time database, a relational database, an object-oriented database, or any other database known in the art. Application 200 can communicate with data store 240 using any type of communication known to one of ordinary skill in the relevant art, such as database connection APIs, including Java Database Connectivity ("JDBC"), Open Database Connectivity ("ODBC"), ActiveX Data Objects ("ADO"), and ADO for .NET ("ADO.NET").

Model layer 210 is a layer of application 200 that provides access to data stored within the one or more integrated objects of data store 240. Model layer 210 also provides business logic implementation for application 200. Model layer 210 includes model component 211, which is a component of application 200. Model component 211 can include data controls and data bindings, where data controls abstract business service implementation details from clients, and data bindings expose data control methods and attributes to components of controller layer 220 and view layer 230. Data controls can also provide for the ability to create data bound pages. Model component 211 can also include business services that manage interaction with application 200 and data store 240. Such business services provide services, such as data persistence, object/relational mapping, transaction management, and business logic execution. Examples of business services include Java® class, Enterprise Java Bean ("EJB") classes, web services, extensible markup language ("XML") files, comma-separated-values ("CSV") files, representational state transfer ("REST") services, business process execution language ("BPEL") processes, and Oracle Application Development Framework ("ADF") Business Components. Furthermore, model component 211 can deliver content to any component of either controller layer 220 or view layer 230. Content can include a web page or a user interface screen, where content can also include one or more images displayed within the web page or user interface screen, such as tables, trees, or tree tables. Content can further include data contained within the web page or user interface screen, where the data can be contained within the one or more tables, trees, or tree tables. In one embodiment, model component 211 can cache data that is retrieved from data store 240 within a memory, so that model component 211 can access the data without the need to retrieve the data from data store 240 a second time. As an example, where application 200 supports a plurality of users, when a first user requests data, model component 211 retrieves the data from data store 240 before delivering the data to the first user. Subsequently, model component 211 can cache the retrieved data within the memory. Thus, when a second user requests the same data, model component 211 can retrieve the data from the memory rather than data store 240. In alternate embodiments, model layer 210 can include any number of model components.

Controller layer 220 manages a flow of application 200 and handles all user interaction with application 200. For example, when a user clicks a search button of a web page displayed by application 200, controller layer 220 determines what action to perform and where to navigate to. Controller layer 220 includes controller component 221, which is a component of application 200. Controller component 221 can be a JavaServer Faces ("JSF") component that can use XML files called view templates (or Facelets views) to process a request from model layer 230, load the appropriate view template, build a component tree, process one or more events, and render a response to model layer 210. Controller component 221 can also be an ADF controller component that includes the functionality of the JSF component, but also provides other additional functionality, such as reusable task flows that pass control not only between JSF pages, but also between other activities such as method calls or other task flows. Furthermore, controller component 221 can deliver one or more events from view layer 230 to model layer 210, where an event may comprise a request for content, and can deliver content from model layer 210 to view layer 230. In alternate embodiments, controller layer 220 can include any number of controller components.

View layer 230 provides a user interface that can be displayed for application 200 and transmits events to controller layer 220, where an event can comprise a request to model layer 210 for content. View layer 230 can also display content within the user interface, where the content is delivered by model layer 210, and where the content can include data. View layer 230 includes desktop view component 231, mobile view component 232, and browser-based view component 233, which are all components of application 200. Desktop view component 231 can provide a user interface for a desktop client application. Mobile view component 232 can provide a user interface for a mobile client application. Browser-based view component 233 can provide a user interface for a browser-based client application that is implemented within a web browser. In alternate embodiments, view layer 230 can include any number of desktop view components, mobile view components, and browser-based view components.

According to the embodiment, model component 211 also includes content delivery API 212. When model component 211 receives a request from a view component of view layer 230 (such as desktop view component 231, mobile view component 232, and browser-based view component 233) to deliver content, where the content includes data, content delivery API 212 can specify when the data should be delivered. Specifically, content delivery API 212 can determine whether the data is available within model component 211, or whether model component 211 is required to retrieve the data from data store 240. If the data is available within model component 211, then model component 211 substantially immediately delivers the data, in addition to the other content, to the view component of the view layer 230, where the view component renders the content, including the data, and displays the content and data. However, if the requested data is not available within model component 211, then model component 211 delivers the content without the data to the view component of view layer 230. The view component of view layer 230 renders the content and a data placeholder in place of the data, and displays the content and the data placeholder. Subsequently, model component 211 retrieves the data from data store 240. Once model component 211 has retrieved the data from data store 240, model component 211 delivers the data to the view component of view layer 230, where the view component renders the data and replaces the display of the data placeholder with a display of the data.

Figure 3:
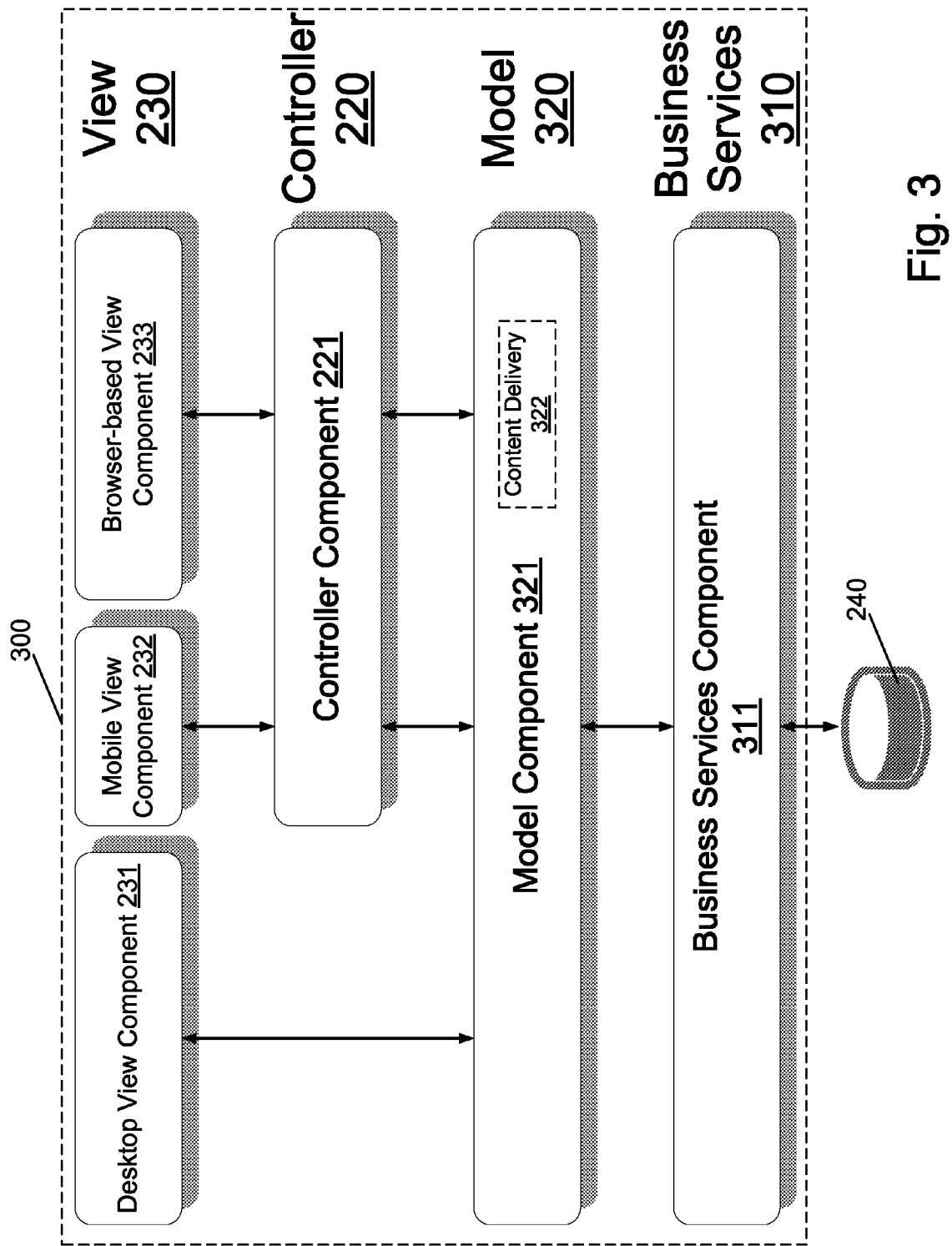
FIG. 3 illustrates an application that includes a business services layer, a model layer, a controller layer, and a view layer according to an MVC architecture, in accordance with an embodiment of the invention.

FIG. 3 illustrates an application 300 that includes a business services layer 310, a model layer 320, a controller layer 220, and a view layer 230 according to a MVC architecture, in accordance with an embodiment of the invention. Application 300 is similar to application 200, and layers and components of application 300 that provide the same functionality as the layers and components of application 200 are not described in greater detail.

Business services layer 310 is a layer of application 300 that provides access to data stored within the one or more integrated objects of data store 240. Business services layer 310 includes business services component 311, which is a component of application 300. Business services component 311 can include business services that manage interaction with application 200 and data store 240. Such business services provide services, such as data persistence, object/relational mapping, transaction management, and business logic execution. Examples of business services include Java® class, EJB classes, web services, XML files, CSV files, REST services, BPEL processes, and Oracle ADF Business Components. In alternate embodiments, business services layer 310 can include any number of business services components.

Model layer 320 is a layer of application 300 that is an abstraction layer and sits on top of business services layer 310. Model layer 320 operatively connects the business services components of business services layer 310 to the components of controller layer 220 and view layer 320 that use the business service components. Model layer 320 provides a single interface that can be used to access any type of business service. Model layer 320 also provides business logic implementation for application 300. Model layer 320 includes model component 321, which is a component of application 300. Model component 311 can include data controls and data bindings, where data controls abstract business service implementation details from clients, and data bindings expose data control methods and attributes to components of controller layer 220 and view layer 230. Data controls can also provide for the ability to create data bound pages. Furthermore, model component 321 can deliver content to any component of either controller layer 220 or view layer 230. Content can include a web page or a user interface screen, where content can also include one or more images displayed within the web page or user interface screen, such as tables, trees, or tree tables. Content can further include data contained within the web page or user interface screen, where the data can be contained within the one or more tables, trees, or tree tables. In one embodiment, model component 321 can cache data that a business services component (such as business services component 311) retrieves from data store 240 within a memory, so that model component 321 can access the data without the need for a business services component (such as business services component 311) to retrieve the data from data store 240 a second time. In alternate embodiments, model layer 320 can include any number of model components.

According to the embodiment, model component 321 also includes content delivery API 322. When model component 321 receives a request from a view component of view layer 230 (such as desktop view component 231, mobile view component 232, and browser-based view component 233) to deliver content, where the content includes data, content delivery API 322 can specify when the data should be delivered. Specifically, content delivery API 322 can determine whether the data is available within model component 321, or whether model component 321 is required to request that business services component 311 retrieve the data from data store 240 and deliver the data to model component 321. If the data is available within model component 321, then model component 321 immediately delivers the data, in addition to the other content, to the view component of the view layer 230, where the view component renders the content, including the data, and displays the content and data. However, if the requested data is not available within model component 321, then model component 321 delivers the content without the data to the view component of view layer 230. The view component of view layer 230 renders the content and a data placeholder in place of the data, and displays the content and the data placeholder. Subsequently, model component 321 requests that business services component 311 retrieve the data from data store 240. Business services component 311 retrieves the data from data store 240 and delivers the data to model component 321. Once model component 321 has received the data from business services component 311, model component 321 delivers the data to the view component of view layer 230, where the view component renders the data and replaces the display of the data placeholder with a display of the data.

A view layer of an application, including one or more view components, and the view layer's interaction with a model layer, including one or more model components, is now described in greater detail. According to an embodiment, within a view layer of an application, data can be displayed within a page or a user interface screen using a view component. For example, structured data or tabular data can be displayed within tables comprising rows and columns using a table component. Furthermore, hierarchical data can be displayed either within trees using a tree component, or within tree tables, using a tree table component. Table, tree, and tree table components are types of view components, and can be bound to a complete collection of one or more records of data, where the view components repeatedly render the one or more records of data by "stamping" (i.e., selecting) a value for each record. For example, assume a table contains two child column components, where each column displays a single attribute value for the row using an output component and there are four records of data to be displayed. Instead of binding four sets of two output components to display the data, the table itself is bound to the collection of all four records of data and simply "stamps" one set of the output components four times. As each row is "stamped," the data for the current row is copied into an attribute on the table, from which the output component can retrieve the correct values for the row.

The table component displays simple tabular data. Each row in the table displays one object in a collection, where the object represents a record of data. For example, each row in the table displays a row from a data store, where the row contains data. The column component displays the value of attributes for each of the objects. The table component provides a range of features for end users of an application, such as sorting columns, and selecting one or more rows and then executing an application defined action on the selected rows. The table component also provides a range of presentation features, such as showing grid lines and banding, row and column headers, column headers spanning groups of columns, and values wrapping within cells.

Hierarchical data (i.e., data that has parent/child relationships) can be displayed as expandable trees using the tree component. Items are displayed as nodes that mirror the parent/child structure of the data, where data of each node is also displayed. Each top-level node can be expanded to display any child nodes (including the data within each child node), which in turn can also be expanded to display any of their child nodes (including the data within each child node). Each expanded node can then be collapsed to hide child nodes.

Hierarchical data can also be displayed using tree table components. The tree table also displays parent/child nodes that are expandable and collapsible, but in a tabular format, which allows an application to display attribute values for the nodes as columns of data. Like the tree component, the tree table component can show the parent/child relationships between items. And like the table component, the tree table component can also show any attribute values for those items in a column. Most of the features available in a table component are also available in a tree table component.

According to the embodiment, the table, tree, and tree table components are virtualized, meaning not all the rows of data that are present within a model component are delivered to a view component and displayed within a user interface of the application. Instead, a number of rows of data that are delivered to a view component and displayed within the user interface of the application can be limited by a predetermined attribute (i.e., a fetch size attribute), that is discussed below in greater detail. The data can be delivered to the view component immediately upon rendering of the view component (i.e., immediate delivery), after a shell of the view component has been rendered, where the data is delivered in a separate request (i.e., lazy delivery) or when the data is available (i.e., when available delivery). In one embodiment, by default, data is delivered to the view component when the data is available.

With immediate delivery, the data is retrieved during an initial request for the data, and the view component, including the data, is rendered. With lazy delivery, instead of retrieving the data during an initial request, a special separate partial page rendering ("PPR") request is run, and a number of rows of data are returned. In one embodiment, the number of rows of data is a value of a fetch size attribute of the view component. Only a shell of the view component is rendered (such as a page or user interface screen, where the page/user interface screen can include one or more tables, trees, or tree tables) after the initial request, where a data placeholder is rendered in place of the missing data. Because only a shell of the view component is rendered, only a render response phase executes for the view component, allowing the corresponding data to be retrieved, delivered, and displayed. When a user's actions cause a subsequent data retrieval (for example scrolling in a table for another set of rows), another request is executed, and the corresponding data is retrieved, delivered, and displayed. When content delivery is configured to be delivered when it is available (i.e., when available delivery), a model component checks for data availability during the initial request. If the data is available, the data is delivered to the view component. If the data is not available, the data is retrieved during the separate PPR request, as it is with lazy delivery.

In one embodiment, an application can include an attribute that defines when data is delivered from a model component to a view component (i.e., content delivery attribute). According to the embodiment, when the content delivery attribute is set to "immediate," data is fetched at the same time the component is rendered. When the content delivery attribute is set to "lazy," data is fetched and delivered to a view component during a subsequent request. When the content delivery attribute is set to "when available" (the default attribute value), a model component checks if the data is available. If the data is available, the content is delivered immediately. If it is not, then lazy delivery is used. Also according to the embodiment, as previously described, the application can include an attribute that defines a size of a block that should be returned with each data retrieval (i.e., fetch size attribute). When data is retrieved, in either immediate delivery, lazy delivery, or when available delivery, a number of rows retrieved is determined by the fetch size attribute. As previously described, in when available delivery, a model component checks availability of data using a content delivery API. The content delivery API is discussed below in greater detail.

As previously described, view components of a view layer of an application, such as a table component, a tree component, and a tree table component, support immediate delivery, lazy delivery, and when available delivery, where a type of delivery is determined based on a content delivery attribute of the application. To support when available delivery, a model layer of an application can include a content delivery API. The content delivery API provides a set of instructions that support requesting a model component to check for data availability, and a set of instructions that support requesting the model component to retrieve a range of rows of data from a data store. Importantly, the set of instructions that support requesting a model component to check for data availability do not cause data to be retrieved from a data store, nor does the set of instructions call another API that may cause data to be retrieved from the data store. This is because retrieving data from a data store can be an expensive operation, and thus, when available delivery avoids retrieving data from the data store if the data is available within a model component of a model layer, in one embodiment.

According to an embodiment, the content delivery API includes a set of instructions that support requesting a model component to check for data availability. As previously described, "available" means that a model component has cached the data in a memory, and that the model component does not need to retrieve the data from a data store in order to deliver the data to a view component. In one embodiment, the set of instructions allow a view component to request a model component check for data availability by passing a range of rows, where the range of rows correspond to one or more rows of data that are either cached in a memory by an model component, or stored within a data store. According to the embodiment, by passing a range of rows to the model component, the model component is able to determine whether the range of rows is available without iterating over the rows in the range, and without calling another API for each row that may cause the model component to retrieve data from the data store for each row.

Below is an example set of instructions for a content delivery API that support requesting a model component to check for data availability, according to an embodiment of the invention:

```
package org.apache.myfaces.trinidad.model;
/**
 * Defines a set of "local" APIs for a CollectionModel.
 * The "local" APIs allow a client to query the model and determine if a
 * set of rows are locally available. "Locally available" can mean the
 * model has the given set of rows in a local cache and can honor a fetch request
 * efficiently (for example, without performing a SQL query).
 */
public interface LocalRowKeyIndex
{
  /**
   * Given a row index, check if a row is locally available
   * @param rowIndex index of row to check
```

```
 * @return <code>true</code> if row is locally available <code>false</code>
 * otherwise
 */
public boolean isRowLocallyAvailable(int rowIndex);
/**
 * Given a row key, check if a row is locally available
 * @param rowKey row key for the row to check
 * @return <code>true</code> if row is locally available <code>false</code>
 * otherwise
 */
public boolean isRowLocallyAvailable(Object rowKey);
/**
 * Check if a range of rows is locally available starting from a row index
 * @param startIndex staring index for the range
 * @param rowCount number of rows in the range
 * @return <code>true</code> if range of rows is locally available
 * <code>false</code> otherwise
 */
public boolean areRowsLocallyAvailable(int startIndex, int rowCount);
/**
 * Check if a range of rows is locally available starting from a row key
 * @param startRowKey staring row key for the range
 * @param rowCount number of rows in the range
 * @return <code>true</code> if range of rows is locally available
 * <code>false</code> otherwise
 */
public boolean areRowsLocallyAvailable(Object startRowKey, int rowCount);
/**
 * Check if a range of rows is locally available starting from the current row
 * @param rowCount number of rows in the range
 * @return <code>true</code> if range of rows is locally available
 * <code>false</code> otherwise
 */
public boolean areRowsLocallyAvailable(int rowCount);
/**
 * Convenient API to return a row count estimate. This method can be
 * optimized to avoid a data fetch which may be required to return an exact row
 * count.
 * <p>
 * This method can return -1 or a row count estimate if determining
 * exact row count requires a data fetch.
 * When dealing with estimated row counts,
 * the model user needs to gracefully handle the case where isRowAvailable
 * returns <code>false</code> for a row index or a row key.
 * @return estimated row count
 */
public int getEstimatedRowCount( );
/**
 * Helper API to determine if the row count returned from {@link
 * #getEstimatedRowCount}
 * is EXACT, or an ESTIMATE
 */
public Confidence getEstimatedRowCountConfidence( );
/**
 * Enum used in the {@link #getEstimatedRowCountConfidence} API to
 * determine if the row count is exact or an estimate
 */
public enum Confidence
{
 /**
  * The row count returned by {@link #getEstimatedRowCount} is exact
  */
 EXACT,
 /**
  * The row count returned by {@link #getEstimatedRowCount} is an estimate
  */
 ESTIMATE
}
//
// Local Cache management APIs
//
/**
 * clear all rows from the local cache
 */
public void clearLocalCache( );
/**
 * Clear the requested range of rows from the local cache
 * @param startingIndex starting row index for the range to clear
 * @param rowsToClear number of rows to clear from the cache
```

```
     */
    public void clearCachedRows(int startingIndex, int rowsToClear);
    /**
     * Clear the requested range of rows from the local cache
     * @param startingRowKey starting row key for the range to clear
     * @param rowsToClear number of rows to clear from the cache
     */
    public void clearCachedRows(Object startingRowKey, int rowsToClear);
    /**
     * Clear a row from the local cache by row index
     * @param index row index for the row to clear from the cache
     */
    public void clearCachedRow(int index);
    /**
     * Clear a row from the local cache by row key
     * @param rowKey row key for the row to clear from the cache
     */
    public void clearCachedRow(Object rowKey);
    /**
     * Indicates the caching strategy supported by the model
     * @see LocalCachingStrategy
     * @return caching strategy supported by the model
     */
    public LocalCachingStrategy getCachingStrategy( );
    /**
     * Enum used to indicate the type of caching supported by the model
     * @see #getCachingStrategy( )
     */
    public enum LocalCachingStrategy
    {
        /**
         * Caching is not supported
         */
        NONE,
        /**
         * Supports caching certain ranges of rows
         */
        PARTIAL,
        /**
         * Caches all rows
         */
        ALL
    }
}
package org.apache.myfaces.trinidad.model;
/**
 * Defines a set of "local" APIs for a TreeModel.
 * The "local" APIs allow a client to query the tree model and determine if a
 * set of rows are locally available. "Locally available" can mean the
 * model has the given set of rows in a local cache and can honor a fetch request
 * efficiently (for example, without performing a SQL query).
 */
public interface TreeLocalRowKeyIndex
{
    /**
     * Indicates whether data for a child model (children of the current node) is
     * locally available. Locally available means no data fetch is required
     * as a result of a call to <code>enterContainer</code>.
     * @return true if child data is locally available
     */
    public boolean isChildCollectionLocallyAvailable( );
    /**
     * Indicates whether child data for the node with the given index is
     * locally available.
     * @param index row index to check
     * @return true if child data is available, false otherwise
     */
    public boolean isChildCollectionLocallyAvailable(int index);
    /**
     * Indicates whether child data for the node with the given row key is
     * locally available.
     * @param rowKey row key to check
     * @return true if child data is available, false otherwise
     */
    public boolean isChildCollectionLocallyAvailable(Object rowKey);
    /**
     * Check if a range of rows is locally available starting from a row index. The range
     * can include child nodes in any expanded nodes within the range.
```

```
     * @param startIndex staring index for the range
     * @param rowCount number of rows in the range
     * @param disclosedRowKeys set of expanded nodes which may fall within the
     * range to check for availability
     * @return <code>true</code> if range of rows is locally available
     * <code>false</code> otherwise
     */
    public boolean areRowsLocallyAvailable(int startIndex, int rowCount,
RowKeySet disclosedRowKeys);
    /**
     * Check if a range of rows is locally available starting from a row key.
     * The range can include child nodes in any expanded nodes within the range.
     * @param startRowKey staring row key for the range
     * @param rowCount number of rows in the range
     * @param disclosedRowKeys set of expanded nodes which may fall within the
     * range to check for availability
     * @return <code>true</code> if range of rows is locally available
     * <code>false</code> otherwise
     */
    public boolean areRowsLocallyAvailable(Object startRowKey, int rowCount,
RowKeySet disclosedRowKeys);
    /**
     * Check if a range of rows is locally available starting from current position.
     * The rangecan include child nodes in any expanded nodes within the range.
     * @param rowCount number of rows in the range
     * @param disclosedRowKeys set of expanded nodes which may fall within the
     * range to check for availability
     * @return <code>true</code> if range of rows is locally available
     * <code>false</code> otherwise
     */
    public boolean areRowsLocallyAvailable(int rowCount, RowKeySet
disclosedRowKeys);
    }
```

According to the embodiment, the content delivery API defines a public interface, LocalRowKeyIndex, that provides a set of methods that can be implemented by a view component, such as a table component. Specifically, LocalRowKeyIndex provides an isRowLocallyAvailable( ) method. The isRowLocallyAvailable( ) method can receive either a row index parameter or a row key parameter. A row index parameter represents an index of a row of data, and a row key parameter represents a key of a row of data. An index is an integer value, whereas a key is an object value. The isRowLocallyAvailable( ) method can check whether a row is locally available based on either the row index parameter or the row key parameter, and can return a boolean value indicating whether the row is available.

LocalRowKeyIndex also provides an areRowsLocallyAvailable( ) method. The areRowsLocallyAvailable( ) method can receive either a starting index parameter or a starting row key, and can also receive a row count parameter. A starting index parameter represents an index of a row of data that is at a beginning of a range of rows, and a starting row key represents a key of a row of data that is at a beginning of a range of rows. A row count parameter represents a range of rows. The areRowsLocallyAvailable( ) method can check whether a range of rows is locally available based on either the starting index parameter or the starting row key parameter, and the row count parameter, and can return a boolean value indicating whether the range of rows is available. Alternatively, the areRowsLocallyAvailable( ) method can only receive a row count parameter, and the areRowsLocallyAvailable( ) method can check whether a range of rows is locally available based on a current row.

LocalRowKeyIndex can also provide a mechanism for returning a row count estimate. There may be situations where an exact row count cannot be obtained without performing data retrieval from a data store. Since this is not desired when determining whether data is available within a model component, an estimated row count can be used, where an estimated row count can be obtained without performing data retrieval from a data store. The mechanism can include a getEstimatedRowCount( ) that returns a row count estimate. The mechanism can also include a getEstimatedRowCountConfidence( ) method that determines whether a returned row count is an exact row count or an estimated row count. The mechanism can also include an enumerated data type Confidence that can identify whether a row count is an exact row count or an estimated row count. The enumerated data type Confidence can include the values "EXACT," and "ESTIMATE."

LocalRowKeyIndex can also provide a mechanism for managing a local cache of a model component. The mechanism can include a clearLocalCache( ) method that clears all rows from the local cache of the model component. The mechanism can also include a clearCachedRow( ) method. The clearCachedRow( ) method can clear a row from the local cache of the model component. The clearCachedRow( ) method can receive either a row index parameter or a row key parameter. The clearCachedRow( ) method can check clear a row from the local cache based on either the row index parameter or the row key parameter. The mechanism can also include a clearCachedRows( ) method. The clearCachedRows( ) method can clear a requested range of rows from the local cache of the model component. The clearCachedRows( ) method can receive either a starting index parameter or a starting row key, and can also receive a parameter representing a number of rows to clear. The mechanism can also include a getCachingStrategy( ) method that determines a type of caching supported by a mode component. The mechanism can also include an enumerated data type LocalCachingStrategy that can identify whether a model component does not support caching, only supports caching certain ranges of rows, or supports caching all rows. The enumerated data type LocalCachingStrategy can include the values "NONE," "PARTIAL," and "ALL."

The content deliver API also defines a public interface, TreeLocalRowKeyIndex, that provides a set of methods that can be implemented by a view component, such as a tree component or a tree table component. Specifically, TreeLocalRowKeyIndex provides an isChildCollectionLocallyAvailable( ) method. The isChildCollectionLocallyAvailable( ) method can receive either an index parameter or a starting row key. An index parameter represents an index of a row of data for a given node, and a starting row key represents a key of a row of data for a given node. The isChildCollectionLocallyAvailable( ) method can check whether child data for the given node is locally available based on either the index parameter or the row key parameter, and can return a boolean value indicating whether the child data is available. Alternatively, the isChildCollectionLocallyAvailable( ) method can not receive any parameters, and the isChildCollectionLocallyAvailable( ) method can check whether child data for a current node is locally available.

LocalRowKeyIndex also provides an areRowsLocallyAvailable( ) method. The areRowsLocallyAvailable( ) method can receive either a starting index parameter or a starting row key, and can also receive a row count parameter and a row key set parameter. A starting index parameter represents an index of a row of data that is at a beginning of a range of rows, and a starting row key represents a key of a row of data that is at a beginning of a range of rows. A row count parameter represents a range of rows. A row key set parameter represents a set of expanded nodes which may fall within the range to check for availability. The areRowsLocallyAvailable( ) method can check whether a range of rows is locally available, where the range can include child nodes in any expanded nodes within the range, based on either the starting index parameter or the starting row key parameter, the row count parameter, and the row key set parameter, and can return a boolean value indicating whether the range of rows is available. Alternatively, the areRowsLocallyAvailable( ) method can only receive a row count parameter and a row key set parameter, and the areRowsLocallyAvailable( ) method can check whether a range of rows is locally available, where the range can include child nodes in any expanded nodes within the range, based on a current row.

Furthermore, below is an example set of instructions for a content delivery API that support determining whether a range of rows is available without iterating over the rows in the range, and without calling another API for each row that may cause a retrieval of data from the data store for each row, according to an embodiment of the invention:

```
package org.apache.myfaces.trinidad.model;
/**
 * Identifies a collection that is indexed by rowKeys.
 * Data is accessed by setting a rowKey, and then accessing
 * {@link #getRowData}.
 */
public interface RowKeyIndex
{
  /**
   * Gets the number of values in this collection
   * @return -1 if the number of values is not known.
   */
  public int getRowCount( );
  /**
   * Gets the index of the current value.
   * The current value is returned by calling {link #getRowData}
   * @return the zero-based index of the current value, or -1 if there
   * is no current value
   */
  public int getRowIndex( );
  /**
   * Sets up a value at a particular index to be the current value.
   * The current value is returned by calling {link #getRowData}
   * @param rowIndex the zero-based index of the value to make current.
   * Use -1 to clear the current value
   */
  public void setRowIndex(int rowIndex);
  /**
   * Gets the rowKey of the current value.
   * The current value is returned by calling {link #getRowData}
   * @return the rowKey of the current value, or null if there
   * is no current value
   */
  public Object getRowKey( );
  /**
   * Sets up a value at a particular rowKey to be the current value.
   * The current value is returned by calling {link #getRowData}
   * @param rowKey the rowKey of the value to make current.
   * Use null to clear the current value
   */
  public void setRowKey(Object rowKey);
  /**
   * Checks to make sure a value exists for the current index or rowKey.
   * This is useful if the number of values in this collection is not known
   * (See {@link #getRowCount}).
   * @see #getRowKey
   * @see #getRowIndex
   * @return true if a value exists; false otherwise.
   */
  public boolean isRowAvailable( );
  /**
   * Gets the current value identified by the current index or rowKey.
   * @see #getRowKey
   * @see #getRowIndex
   * @return null if the current value has been cleared.
   */
  public Object getRowData( );
  /**
   * Checks to make sure a value exists for the given index.
   * @param rowIndex the index of the row to check.
   * @return true if a value exists; false otherwise.
   */
  public boolean isRowAvailable(int rowIndex);
  /**
   * Gets the row value at the given index.
   * @param rowIndex the index of the row to get data from.
   * @return null if the current value has been cleared.
   */
  public Object getRowData(int rowIndex);
  /**
   * Check for an available row by row key.
   * @param rowKey the row key for the row to check.
   * @return true if a value exists; false otherwise.
   */
  public boolean isRowAvailable(Object rowKey);
  /**
   * Get row data by row key.
   * @param rowKey the row key for the row to get data.
   * @return row data
   */
  public Object getRowData(Object rowKey);
  /**
   * Check if a range of rows is available starting from the current position
   * @param rowsToCheck number of rows to check
   * @return true if all rows in range are available
   */
  public boolean areRowsAvailable(int rowsToCheck);
  /**
   * Check if a range of rows is available from a starting index without
   * requiring the client to iterate over the rows
   * @param startIndex the starting index for the range
   * @param rowsToCheck number of rows to check
   * @return true if all rows in range are available
   */
  public boolean areRowsAvailable(int startIndex, int rowsToCheck) ;
  /**
   * Check if a range of rows is available from a starting row key without
```

```
 * requiring the client to iterate over the rows
 * @param startRowKey the starting row key for the range
 * @param rowsToCheck number of rows to check
 * @return true if all rows in range are available
 */
public boolean areRowsAvailable(Object startRowKey,
  int rowsToCheck);
}
```

According to the embodiment, the content delivery API defines a public interface, RowKeyIndex, that provides a set of methods that accept row keys and can complement other index-based APIs. More specifically, the methods of RowKeyIndex do not require that the row keys be converted to indices. Thus, a view component can use one or more of the methods of RowKeyIndex to check if a range of rows are available within a model component, without requiring the model component to iterate over the rows in the range and call a method of an API that causes a retrieval of data from the data store. The interface identifies a collection that is indexed by row keys, where data is accessed by first setting a row key, and then accessing the collection at the row key.

Specifically, RowKeyIndex includes a getRowCount( ) method. The getRowCount( ) method retrieves a number of values in the collection. RowKeyIndex also includes a getRowIndex( ) method. The getRowIndex( ) method retrieves an index of a current value. RowKeyIndex further includes a setRowIndex( ) method. The setRowIndex( ) method sets up a value at a particular index to be a current value. RowKeyIndex further includes a getRowKey( ) method. The getRowKey( ) method retrieves a row key of a current value. RowKeyIndex also includes a setRowKey( ) method. The setRowKey( ) method sets up a value at a particular row key to be a current value.

RowKeyIndex further includes an isRowAvailable( ) method. The isRowAvailable( ) method can receive a row index parameter, a row key parameter, or no parameter. The isRowAvailable( ) method can check whether a value exists based on either a row index parameter, a row key parameter, or a current row index or row key (when no parameter is given), and can return a boolean value indicating whether the row is available.

RowKeyIndex further includes a getRowData( ) method. The getRowData( ) method can receive a row index parameter, a row key parameter, or no parameter. The getRow Data( ) method can retrieve a current value based on either a row index parameter, a row key parameter, or a current row index or row key (when no parameter is given), and can return the current value.

RowKeyIndex also provides an areRowsAvailable( ) method. The areRowsAvailable( ) method can receive either a starting index parameter or a starting row key, and can also receive a row count parameter. The areRowsAvailable( ) method can check whether a range of rows is available without requiring an iteration over the rows, based on either the starting index parameter or the starting row key parameter, and the row count parameter, and can return a boolean value indicating whether the range of rows is available. Alternatively, the areRowsLocallyAvailable( ) method can only receive a row count parameter, and the areRowsLocallyAvailable( ) method can check whether a range of rows is available without requiring an iteration over the rows, based on a current row.

Figure 4:
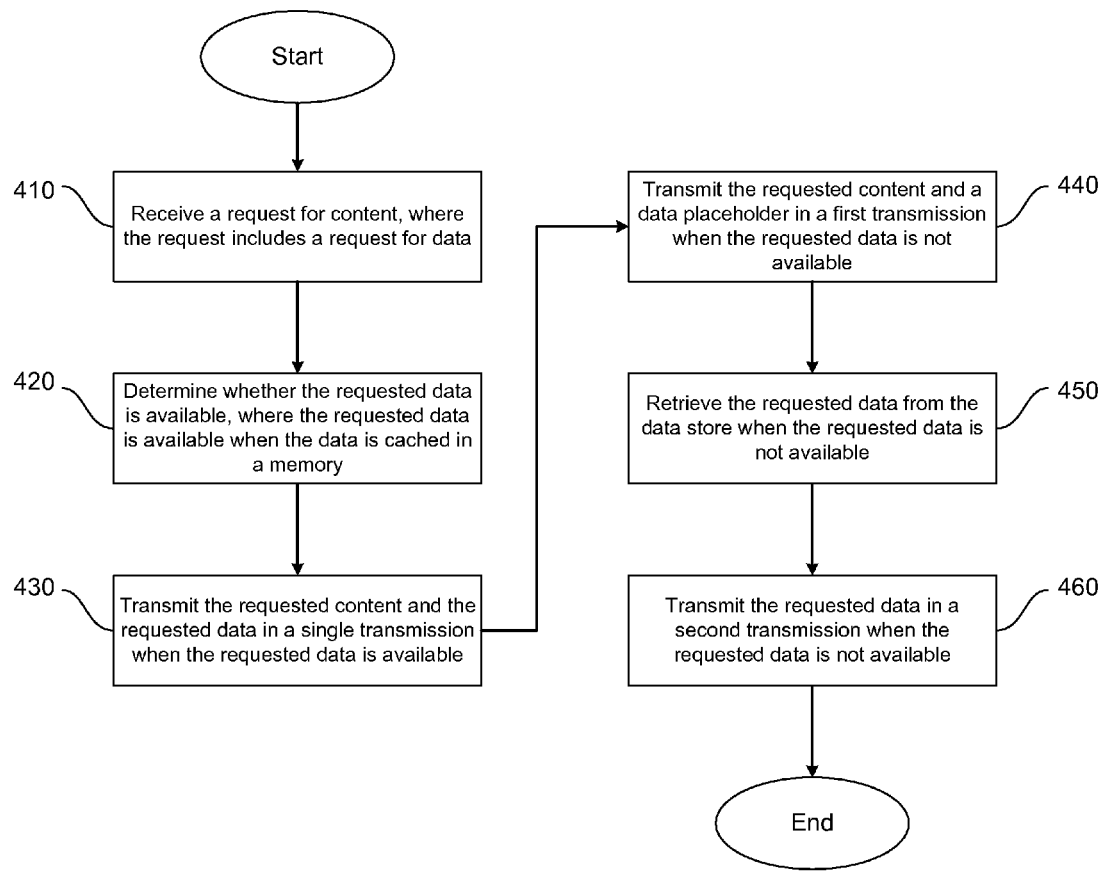
FIG. 4 illustrates a flow diagram of the functionality of a content delivery module, according to an embodiment of the invention.

FIG. 4 illustrates a flow diagram of the functionality of a content delivery module (such as content delivery module 16 of FIG. 1), according to an embodiment of the invention. In one embodiment, the functionality of the flow diagram of FIG. 4, and the functionality of the flow diagrams of FIGS. 5 and 6, described below, are each implemented by software stored in a memory or some other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 410, a request for content is received, where the request includes a request for data. In one embodiment, the content includes a web page that includes one or more tables, trees, or tree tables. In another embodiment, the content includes a user interface screen that includes one or more tables, trees, or tree tables. In certain embodiments, the data includes data stored within a data store. In these embodiments, the request for data includes a range of rows of data. In one embodiment, the data includes structured data. In another embodiment, the data includes hierarchical data. In another embodiment, the data includes tabular data.

At 420, it is determined whether the requested data is available. In certain embodiments, the data is available when the data is cached in a memory. In these embodiments, it is determined whether the requested data is available by invoking one or more methods of a content delivery API. According to these embodiments, the content delivery API includes one or more instructions for determining whether the requested data has been cached in a memory.

At 430, when the requested data is available, the requested content and the requested data is transmitted in a single communication. The requested content and the requested data are subsequently displayed within a user interface of an application. In one embodiment, a web page that includes a table is displayed, where the table includes the data. In another embodiment, a user interface screen that includes a table is displayed, where the table includes the data.

At 440, when the requested data is not available, the requested content and a data placeholder are transmitted in a first communication. The requested content and the data placeholder are subsequently displayed within the user interface of the application. In certain embodiments, the data placeholder includes text that indicates that the data is being retrieved. In other embodiments, the data placeholder includes an image that indicates that the data is being retrieved. In one embodiment, a web page that includes a table is displayed, where the table includes the data placeholder. In another embodiment, a user interface screen that includes a table is displayed, where the table includes the data place holder.

At 450, when the requested data is not available, the requested data is retrieved from a data store. In certain embodiments, retrieving the requested data from the data store includes transmitting a fetch instruction to the data store.

At 460, when the requested data is not available, the requested data is transmitted in a second communication. The requested data is subsequently displayed in place of the data placeholder within the user interface of the application. In certain embodiments, the first communication is a separate communication from the second communication. In one embodiment, the display of the data placeholder within the table of the web page is replaced with a display of the data. In another embodiment, the display of the data placeholder within the table of the user interface screen is replaced with a display of the data.

Figure 5:
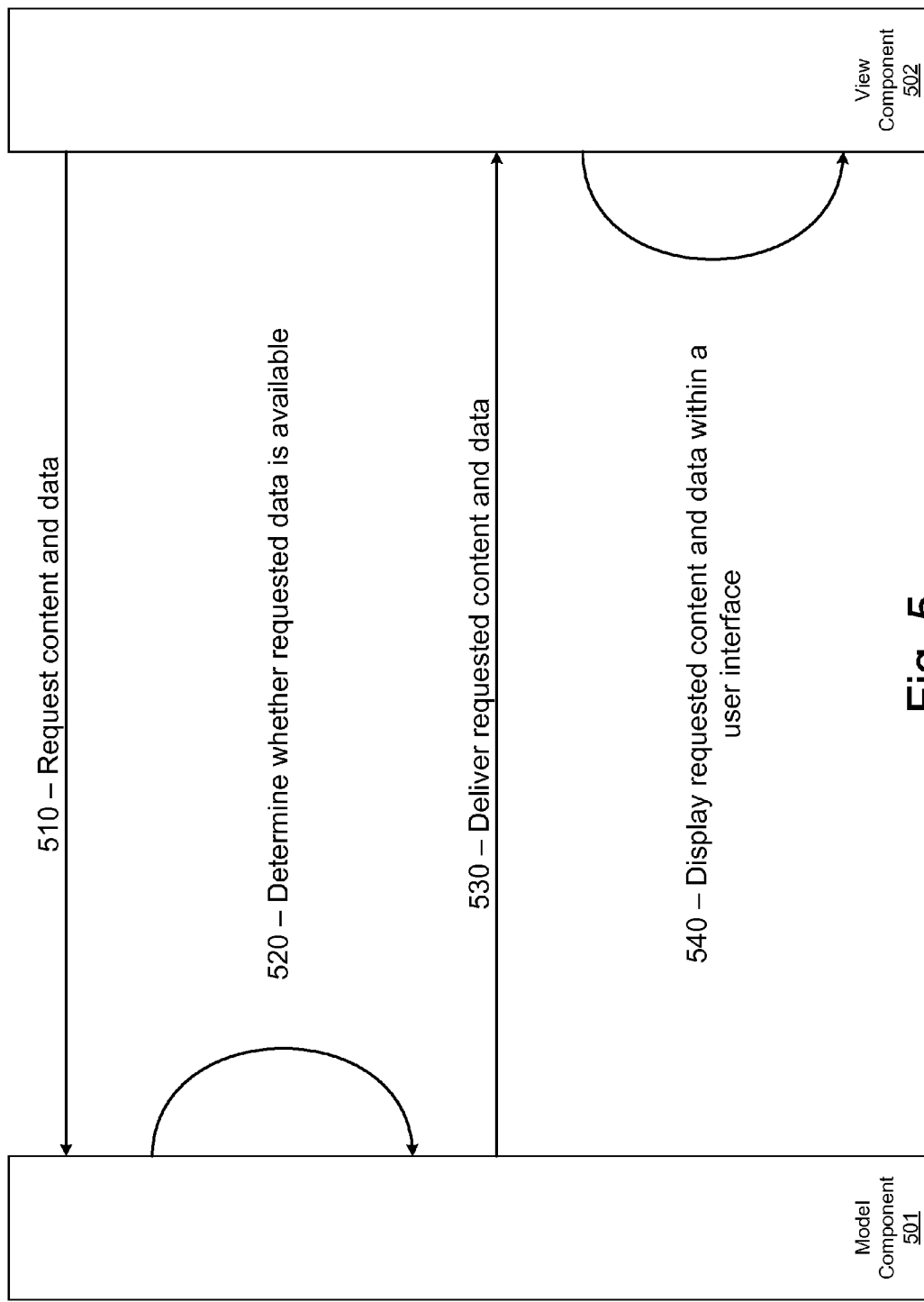
FIG. 5 illustrates a flow diagram of the functionality of an interaction between a model component and a view component of an application when data is available at the model component, according to an embodiment of the invention.

FIG. 5 illustrates a flow diagram of the functionality of an interaction between a model component 501 and a view component 502 of an application when data is available at model component 501, according to an embodiment of the invention. As previously described, model component 501 is a component of a model layer of an application, and view component 502 is a component of a view layer of the application. In certain embodiments, model component 501 and view component 502 can communicate directly with each other. In alternate embodiments, model component 501 and view component 502 communicate via a controller component of a controller layer of the application.

At 510, view component 502 transmits a request for content to model component 501, where the request for content includes a request for data. In one embodiment, the request for content is a request for a web page that includes one or more tables, trees, or tree tables, where the tables, trees, or tree tables, include data. In another embodiment, the request for content is a request for a user interface screen that includes one or more tables, trees, or tree tables, where the tables, trees, or tree tables, include data. The data can include structured data, tabular data, or hierarchical data, that can be stored at a data store. In one embodiment the request for data includes a range of rows of data within a data store.

At 520, model component 501 determines whether the requested data is available. In one embodiment, data is available within model component 501 when model component 501 has cached the data in a memory and can deliver the data immediately upon request without first retrieving the data from a data store. According to the embodiment, model component 501 includes a content delivery API that includes one or more instructions for determining whether the requested data has been cached in a memory. Model component 501 can invoke a method of the content delivery API and pass in the range of rows of data as a parameter of the method. Thus, model component 501 can determine whether the range of rows of data is cached within the memory. According to the embodiment, model component 501 can make this determination without causing the requested data to be retrieved from the data store, and without calling another API that causes the requested data to be retrieved from the data store. In one embodiment, model component 501 can make this determination based on a confidence attribute. In the embodiment illustrated in FIG. 5, the requested data is available.

At 530, model component 501 delivers the requested content and data to view component 502. In one embodiment, model component 501 retrieves the requested data from the memory, and transmits the requested data, along with the requested content, to view component 502 in a single communication. According to the embodiment, no data is retrieved from a data store.

At 540, view component 502 displays the requested content and data within a user interface of the application. In one embodiment, the requested content is a web page that includes one or more tables, trees, or tree tables. According to this embodiment, view component 502 displays the web page, including the one or more tables, trees, or tree tables, within a user interface of a web browser. Furthermore, view component 502 displays the requested data within the one or more tables, tree, or tree tables, within the web page. In another embodiment, the requested content is a user interface screen that includes one or more tables, trees, or tree tables. According to this embodiment, view component 502 displays the user interface screen, including the one or more tables, tree, or tree tables, within a user interface of a display. Furthermore, view component 502 displays the requested data within the one or more tables, tree, or tree tables, within the user interface screen.

Figure 6:
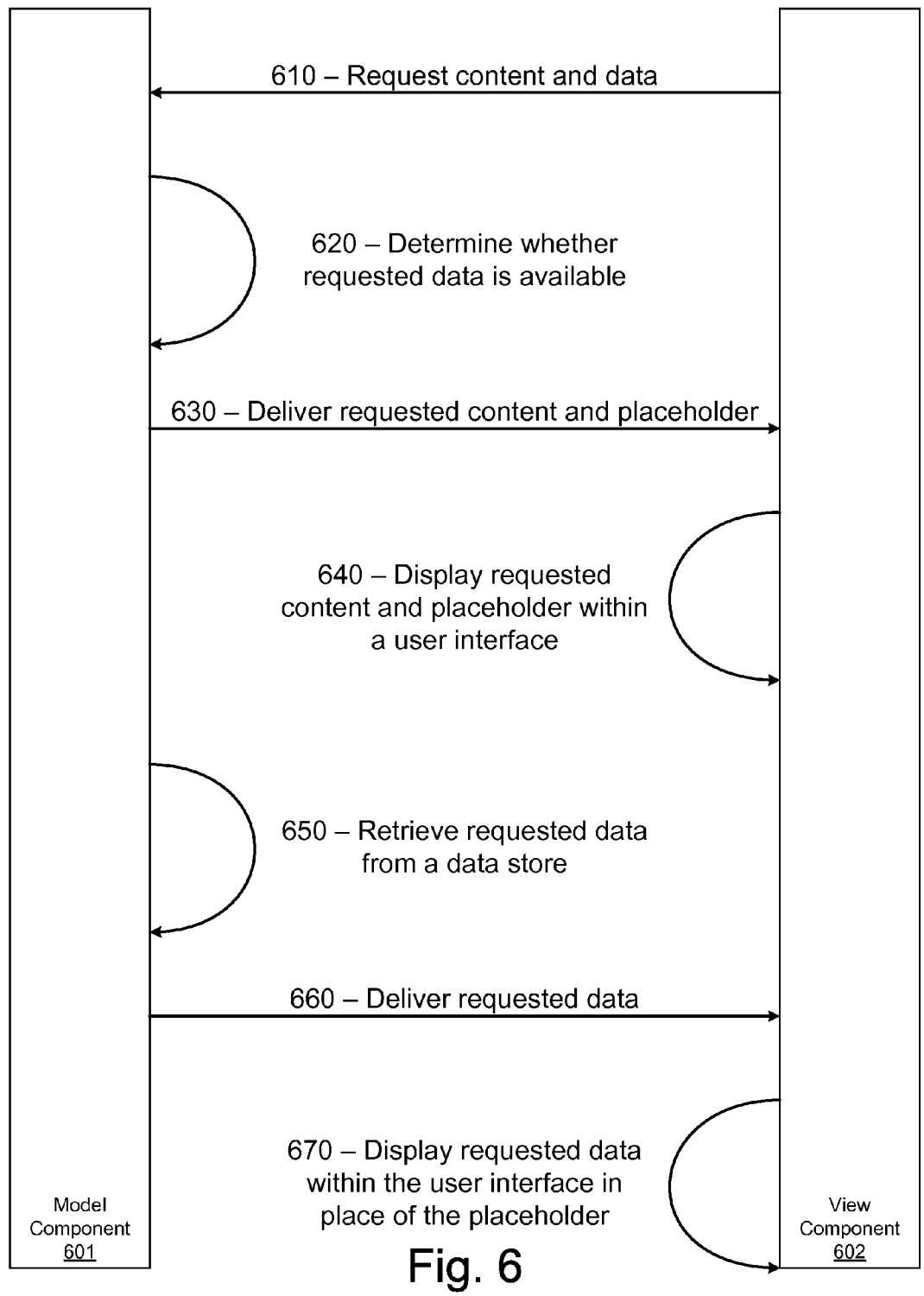
FIG. 6 illustrates a flow diagram of the functionality of an interaction between a model component and a view component of an application when data is not available at the model component, according to an embodiment of the invention.

FIG. 6 illustrates a flow diagram of the functionality of an interaction between a model component 601 and a view component 602 of an application when data is not available at model component 601, according to an embodiment of the invention. As previously described, model component 601 is a component of a model layer of an application, and view component 602 is a component of a view layer of the application. In certain embodiments, model component 601 and view component 602 can communicate directly with each other. In alternate embodiments, model component 601 and view component 602 communicate via a controller component of a controller layer of the application.

At 610, view component 602 transmits a request for content to model component 601, where the request for content includes a request for data. In one embodiment, the request for content is a request for a web page that includes one or more tables, trees, or tree tables, where the tables, trees, or tree tables, include data. In another embodiment, the request for content is a request for a user interface screen that includes one or more tables, trees, or tree tables, where the tables, trees, or tree tables, include data. The data can include structured data, tabular data, or hierarchical data, that can be stored at a data store. In one embodiment the request for data includes a range of rows of data within a data store.

At 620, model component 601 determines whether the requested data is available. In one embodiment, data is available within model component 601 when model component 601 has cached the data in a memory and can deliver the data immediately upon request without first retrieving the data from a data store. According to the embodiment, model component 601 includes a content delivery API that includes one or more instructions for determining whether the requested data has been cached in a memory. Model component 601 can invoke a method of the content delivery API and pass in the range of rows of data as a parameter of the method. Thus, model component 601 can determine whether the range of rows of data is cached within the memory. According to the embodiment, model component 601 can make this determination without causing the requested data to be retrieved from the data store, and without invoking another API that causes the requested data to be retrieved from the data store. In the embodiment illustrated in FIG. 6, the requested data is not available.

At 630, model component 601 delivers the requested content and a data placeholder to view component 602. In one embodiment, model component 601 creates a data placeholder and transmits the data placeholder, along with the requested content, to view component 602 in a first communication. According to an embodiment, the data placeholder can be text that indicates that data is currently being retrieved. In another embodiment, the data placeholder can be an image that indicate that data is currently being retrieved. In both of these embodiments, the data placeholder can be displayed within a user interface of the application.

At 640, view component 602 displays the requested content and the data placeholder within a user interface of the application. In one embodiment, the requested content is a web page that includes one or more tables, trees, or tree tables. According to this embodiment, view component 602 displays the web page, including the one or more tables, trees, or tree tables, within a user interface of a web browser. Furthermore, view component 602 displays the data placeholder within the one or more tables, tree, or tree tables, within the web page. In another embodiment, the requested content is a user interface screen that includes one or more tables, trees, or tree tables. According to this embodiment, view component 602 displays the user interface screen, including the one or more tables, tree, or tree tables, within a user interface of a display. Furthermore, view component 602 displays the data placeholder within the one or more tables, tree, or tree tables, within the user interface screen.

At 650, model component 601 retrieves the requested data from a data store (not shown in FIG. 6). In one embodiment, model component 601 transmits a fetch instruction to the data store, instructing that the requested data be fetched. According to an embodiment where the requested data is a range of rows of data, model component 601 provides the range of rows of data to the data store. Model component 601 subsequently receives the requested data from the data store. According to an embodiment where the requested data is a range of rows of data, model component 601 retrieves one or more rows of data from the data store. In an alternate embodiment, model component 601 transmits a fetch instruction to a business services component (not shown in FIG. 6) of a business services layer (also not shown in FIG. 6) of the application. In this alternate embodiment, the business services component receives the fetch instruction, and subsequently transmits a fetch instruction to the data store. The business services component receives the requested data from the data store and transmits the requested data to model component 601.

At 660, model component 601 delivers the requested data to view component 602. In one embodiment, model component 601 transmits the requested data to view component 602 in a second communication. The second communication is separate from the first communication previously described in relation to 630. In one embodiment, the second communication is asynchronous to the first communication.

At 670, view component 602 displays the requested data within the user interface of the application in place of the data placeholder. In one embodiment, view component 602 replaces the display of the data placeholder within the one or more tables, trees, or tree tables of the web page, with a display of the requested data. In another embodiment, view component 602 replaces the display of the data placeholder within the one or more tables, trees, or tree tables of the user interface screen, with a display of the requested data.

FIG. 7 illustrates a user interface of an application that displays a table 700 that includes data 710, according to an embodiment of the invention. Table 700 is an example of a table that can be displayed by a view component of the application within a user interface of the application. As previously described, while the view component displays a table in the illustrated embodiment, in alternate embodiments, the view component can display other structures, such as a tree or a tree table. Furthermore, data 710 is an example of data that can be stored within a data store, or cached within a memory by a model component of the application. In the illustrated embodiment, data 710 is structured data that can be displayed within table 700, when data 710 is delivered by the model component to the view component.

Figure 8:
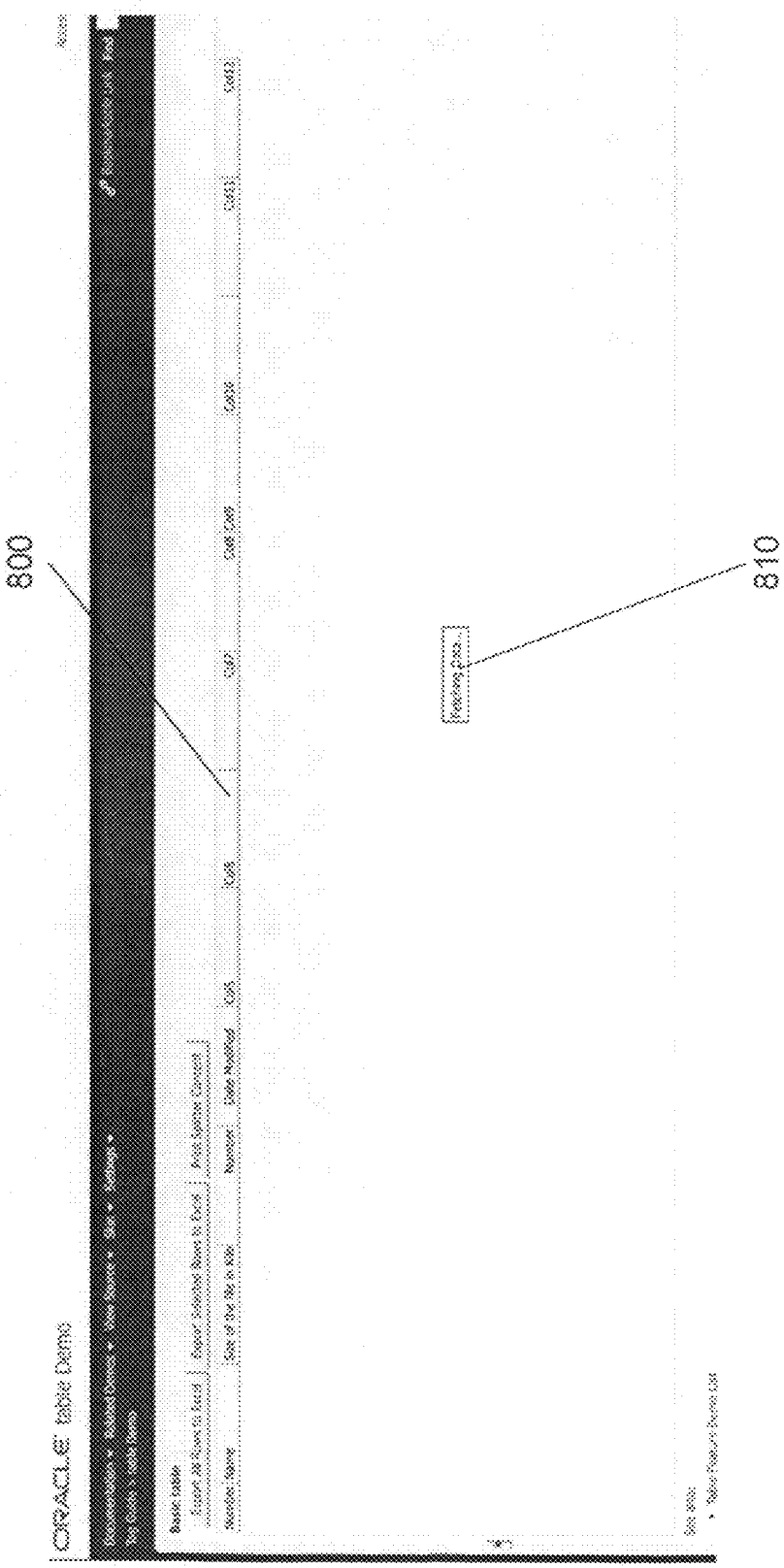
FIG. 8 illustrates a user interface of an application that displays a table that includes a data placeholder in place of data, according to an embodiment of the invention.

FIG. 8 illustrates a user interface of an application that displays a table 800 that includes a data placeholder 810 in place of data, according to an embodiment of the invention. Similar to table 700 of FIG. 7, table 800 is an example of a table that can be displayed by a view component of the application within a user interface of the application. Furthermore, data placeholder 810 is an example of a data placeholder that can be displayed by a view component when a model component delivers a data placeholder rather than requested data. Subsequently, when the model component delivers the requested data, the view component can update the display within the user interface by replacing data placeholder 810 with the requested data.

Thus, in an embodiment of the invention, a view layer of an application is able to query a model layer for available data, and the model layer is able to deliver the data based on data availability in the model layer. Data availability can mean, in one embodiment, that the model layer has cached the data in a memory and can deliver the data immediately upon request. Thus, according to the embodiment, a response time to show a page or a user interface screen in the view layer is significantly decreased. This is because, if the data is already available within the model layer, it is immediately delivered to the view layer. It is only when the data is not already available within the model layer, where the model layer makes a request to fetch the data, and delivers the data to the view layer is a subsequent request. Furthermore, the use of the when available content delivery feature can be customized for specific applications, such as applications targeted for a local area network, and applications targeted for a wide area network.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to deliver content to a user interface of an application, the delivering comprising:
   receiving a request for content, wherein the request comprises a request for data;
   determining whether the requested data is available, wherein the requested data is available when the data is cached in a memory;
   transmitting the requested content and the requested data in a single communication when the requested data is available, wherein the requested content and the requested data are displayed within the user interface of the application;
   transmitting the requested content and a data placeholder in a first communication when the requested data is not available, wherein the requested content and the data placeholder are displayed within the user interface of the application, wherein the data placeholder is displayed in place of the requested data, and wherein the data placeholder indicates that the requested data is being retrieved;

retrieving the requested data from a data store when the requested data is not available; and transmitting the requested data in a second communication when the requested data is not available, wherein the requested data is displayed in place of the data placeholder within the user interface of the application;

wherein the requested data is delivered according to a content delivery attribute, and wherein the content delivery attribute defines when the requested data is delivered.

2. The non-transitory computer-readable medium of claim 1, wherein the determining whether the requested data is available further comprises invoking one or more methods of a content delivery application programming interface, wherein the content delivery application programming interface comprises one or more instructions for determining whether the requested data has been cached in a memory.

3. The non-transitory computer-readable medium of claim 1, wherein the requested data comprises a range of rows of data.

4. The non-transitory computer-readable medium of claim 1, wherein the application comprises a model layer and a view layer, the model layer comprises a model component, and the view layer comprises a view component;

wherein the model component receives the request for content from the view component;

wherein the model component determines whether the requested data is available within the model component without retrieving the data from the data store;

wherein the model component transmits the requested content and the requested data to the view component in the single communication when the requested data is available;

wherein the model component transmits the requested content and the data placeholder to the view component in the first communication when the requested data is not available;

wherein the model component retrieves the requested data from the data store when the requested data is not available; and wherein the model component transmits the requested data to the view component in the second communication when the requested data is not available.

5. The non-transitory computer-readable medium of claim 1, wherein the content comprises a web page that comprises one or more tables, trees, or tree tables.

6. The non-transitory computer-readable medium of claim 1, wherein the content comprises a user interface screen that comprises one or more tables, tree, or tree tables.

7. The non-transitory computer-readable medium of claim 1, wherein the data comprises data that is stored in the data store.

8. The non-transitory computer-readable medium of claim 1, wherein the data placeholder comprises text or an image.

9. The non-transitory computer-readable medium of claim 1, wherein the first communication is a separate communication from the second communication.

10. The non-transitory computer-readable medium of claim 1, wherein the content delivery attribute defines the requested data to be delivered: (a) at the same time that the requested content is delivered; (b) after the requested content is delivered; or (c) at the same time that the requested content is delivered when the requested data is available and after the requested content is delivered when the requested data is not available.

11. The non-transitory computer-readable medium of claim 1, wherein the requested data comprises a range of rows of data;

wherein a method of a content delivery application programming interface is invoked and the range of rows of data is passed as a parameter of the method; and wherein it is determined whether the range of rows of data is cached within the memory.

12. The non-transitory computer-readable medium of claim 11, wherein a number of rows of the requested data is limited by a pre-determined fetch size attribute.

13. A computer-implemented method for delivering content to a user interface of an application, the computer-implemented method comprising:

receiving a request for content, wherein the request comprises a request for data;

determining whether the requested data is available, wherein the requested data is available when the data is cached in a memory;

transmitting the requested content and the requested data in a single communication when the requested data is available, wherein the requested content and the requested data are displayed within the user interface of the application;

transmitting the requested content and a data placeholder in a first communication when the requested data is not available, wherein the requested content and the data placeholder is displayed within the user interface of the application, wherein the data placeholder is displayed in place of the requested data, and wherein the data placeholder indicates that the requested data is being retrieved;

retrieving the requested data from a data store when the requested data is not available; and transmitting the requested data in a second communication when the requested data is not available, wherein the requested data is displayed in place of the data placeholder within the user interface of the application wherein the requested data is delivered according to a content delivery attribute, and wherein the content delivery attribute defines when the requested data is delivered.

14. The computer-implemented method of claim 13, wherein the determining whether the requested data is available further comprises invoking one or more methods of a content delivery application programming interface, wherein the content delivery application programming interface comprises one or more instructions for determining whether the requested data has been cached in a memory.

15. The computer-implemented method of claim 13, wherein the requested data comprises a range of rows of data.

16. The computer-implemented method of claim 13, wherein the application comprises a model layer and a view layer, the model layer comprises a model component, and the view layer comprises a view component;

wherein the model component receives the request for content from the view component;

wherein the model component determines whether the requested data is available within the model component without retrieving the data from a data store;

wherein the model component transmits the requested content and the requested data to the view component in the single communication when the requested data is available;

wherein the model component transmits the requested content and the data placeholder to the view component in the first communication when the requested data is not available;

wherein the model component retrieves the requested data from the data store when the requested data is not available; and wherein the model component transmits the requested data to the view component in the second communication when the requested data is not available.

17. The computer-implemented method of claim 13, wherein the content comprises a web page that comprises one or more tables, trees, or tree tables.

18. The computer-implemented method of claim 13, wherein the content comprises a user interface screen that comprises one or more tables, tree, or tree tables.

19. A system, comprising:

a memory;

a request receiving module that is stored in the memory and configured to receive a request for content, wherein the request comprises a request for data;

an availability determination module that is stored in the memory and configured to determine whether the requested data is available, wherein the requested data is available when the data is cached in a memory;

a content transmitting module that is stored in the memory and configured to transmit the requested content and the requested data in a single communication when the requested data is available, wherein the requested content and the requested data are displayed within a user interface;

wherein the content transmitting module is further configured to transmit the requested content and a data placeholder in a first communication when the requested data is not available, wherein the requested content and the data placeholder are displayed within the user interface, wherein the data placeholder is displayed in place of the requested data, and wherein the data placeholder indicates that the requested data is being retrieved;

a data retrieval module that is stored in the memory and configured to retrieve the requested data from the data store when the requested data is not available;

wherein the content transmitting module is further configured to transmit the requested data in a second communication when the requested data is not available, wherein the requested data is displayed in place of the data placeholder within the user interface; and wherein the requested data is delivered according to a content delivery attribute, and wherein the content delivery attribute defines when the requested data is delivered.

20. The system of claim 19, wherein the availability determination module is further configured to invoke one or more methods of a content delivery application programming interface, wherein the content delivery application programming interface comprises one or more instructions for determining whether the requested data has been cached in a memory.

21. The system of claim 19, wherein the requested data comprises a range of rows of data.

22. The system of claim 19, further comprising:

a model layer comprising a model component;

a view layer comprising a view component;

wherein the model component comprises the request receiving module, availability determination module, content transmitting module, and data retrieval module.

23. The system of claim 19, wherein the content comprises a web page that comprises one or more tables, trees, or tree tables.

* * * * *